United States Patent [19]
Pogue, Jr. et al.

[11] Patent Number: 5,144,667
[45] Date of Patent: Sep. 1, 1992

[54] METHOD OF SECURE REMOTE ACCESS

[75] Inventors: Russell W. Pogue, Jr., Kokomo, Ind.; Ronald L. Rivest, Arlington, Mass.

[73] Assignee: Delco Electronics Corporation, Kokomo, Ind.

[21] Appl. No.: 630,626

[22] Filed: Dec. 20, 1990

[51] Int. Cl.$^5$ .................................. H04L 9/02
[52] U.S. Cl. ........................ 380/45; 380/25; 380/21; 340/825.31
[58] Field of Search .......... 380/21, 23, 25, 30, 380/43, 44, 45, 46, 48, 49, 50; 340/825.31

[56] References Cited
U.S. PATENT DOCUMENTS

| | | | |
|---|---|---|---|
| 3,911,397 | 10/1975 | Freeny, Jr. | 380/23 X |
| 4,731,840 | 3/1988 | Mniszewski et al. | 380/21 |
| 4,746,788 | 5/1988 | Kawana | 380/23 X |
| 4,799,061 | 1/1989 | Abraham et al. | 380/23 X |
| 4,864,615 | 9/1989 | Bennett et al. | 380/21 |
| 4,942,393 | 7/1990 | Waraksa et al. | 340/825.31 X |

Primary Examiner—Tod Swann
Attorney, Agent, or Firm—A. Frank Duke

[57] ABSTRACT

Access to a vehicle by a remote electronic key via a radio link is secured by an exchange of encrypted signals. A remote unit having a secret number is introduced to a base unit and a common key is agreed upon by an exponential key exchange. The common key is encrypted using the secret number and stored in the base unit. Thereafter, the base unit is able to authenticate the identity of the remote unit by sending the encrypted common key and a random number to the remote unit which decrypts the key and uses it to encrypt the random number. The random number is also encrypted in the base unit and compared with the encrypted random number from the remote unit.

12 Claims, 2 Drawing Sheets

METHOD OF SECURE REMOTE ACCESS

FIELD OF THE INVENTION

This invention relates to a method of remotely accessing a secure system using encrypted keys which is applicable to automotive vehicle entry.

BACKGROUND OF THE INVENTION

It is well known to use digitally encoded signals over a radio link to open garage doors or unlock vehicle doors, for example, from a remote transmitter. Commonly, systems employing such control methods have a remote unit which may be carried in ones pocket or on a key chain and have a button which is pressed to issue a command signal. It is very desirable to make such systems secure from unauthorized use. This is especially important when the remote transmitter is used not only to unlock a vehicle door but also to unlock the vehicle ignition switch. When the signals are transmitted by radio, it is possible for a person using electronic eavesdropping to record the signals for later retransmission to operate the vehicle. More elaborate signalling procedures are needed to preclude such practices.

Encryption practices have been used for secure communications in areas of national security or for computer security, for example. To achieve the highest security, rather elegant methods have been adopted. A number of recent developments are described in the paper by Diffie, "The First Ten Years of Public-Key Cryptography", Proc. IEEE, Vol. 76, No. 5, May 1988, pp 560-577, which is incorporated herein by reference. The RSA public key system described therein is a widely accepted security measure which might be used for vehicle security. A precursor of the public key system, also described by Diffie, is the exponential key exchange. This is used along with other cryptographic techniques in the system described below.

The proposed system has a unique remote unit which can be positively verified by the base unit on the vehicle and cannot be imitated. The system further has the following objectives:
1. It has a high level of security even if all communications can be monitored and all aspects of the design are known.
2. The remote unit cannot be copied or imitated even with physical access to the unit.
3. One remote unit may be used with an unlimited number of base units.
4. Compromise of one base unit shall not compromise other uses of the same remote unit.
5. No operator input is needed beyond sign-up initiation.
6. All functions other than radio transmission can be implemented by a single IC for each unit which can operate at very low power and complete the normal functions in a fraction of a second.

SUMMARY OF THE INVENTION

It is therefore an object of the invention to provide a method of positively authenticating a remote unit through cryptographic techniques.

The invention is carried out in a secure remote access system having a base unit and a remote unit coupled by a communication link, by a method of encrypted communication comprising the steps of: registering the remote unit with the base unit by establishing a common key by communication between the base unit and the remote unit, and storing the common key and an encrypted form of the common key in the base unit; then authenticating the remote unit by encrypting a random number with the common key in the base unit, passing the encrypted common key and a challenge number from the base unit to the remote unit wherein the challenge number comprises the random number or the encrypted random number, decrypting the common key in the remote unit, operating on the challenge number with the common key in the remote unit, and comparing the results.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a security method and system designed for use in unlocking vehicle doors and/or ignition switches by an electronic key coupled to the vehicle by a radio link. The same electronic key or remote unit can be used with an unlimited number of base units to gain access to home, office or other vehicles, for example. It will be apparent, however, that the method is applicable as well to other uses such as signal transmission within a vehicle, computer system security, vehicle identification for toll payments or car rental returns, for example, among other uses.

Figure 1:
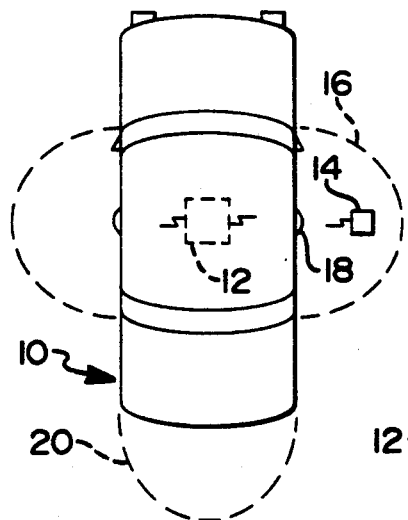
FIG. 1 is a schematic diagram of a remote access system for an automotive vehicle.

FIG. 1 shows a vehicle 10 equipped with a remote access system including a base unit 12 in the vehicle and a remote unit 14 typically carried in the vehicle operator's pocket or purse. The units are coupled by radio communication effective over a short distance. As indicated by dotted lines 16 adjacent each vehicle door handle 18 and lines 20 adjacent the vehicle trunk, minimum distances of only a few feet are required although a larger radius of communication is acceptable. It is intended that when the operator carries the remote unit within radio range of the base unit the system will automatically act to unlock the door without activation by the operator, provided that the identification of the remote unit can be verified. In some applications the units are activated only when the operator touches or tries to operate the door handle 18.

A randomly chosen secret key S, at least 56 bits long, and a unique ID are permanently programmed in the remote unit (using an EPROM) at the time of manufacture. By choosing S from a very large number of possibilities, S is probably unique but it is only necessary that there be no way to determine S. In particular, the manufacturing equipment that programs the remote units with their unique ID and secret S must destroy all memory of S after it has verified proper programming. To keep S secret another bit is programmed to prevent reading S and to prevent any further programming.

Figure 2:
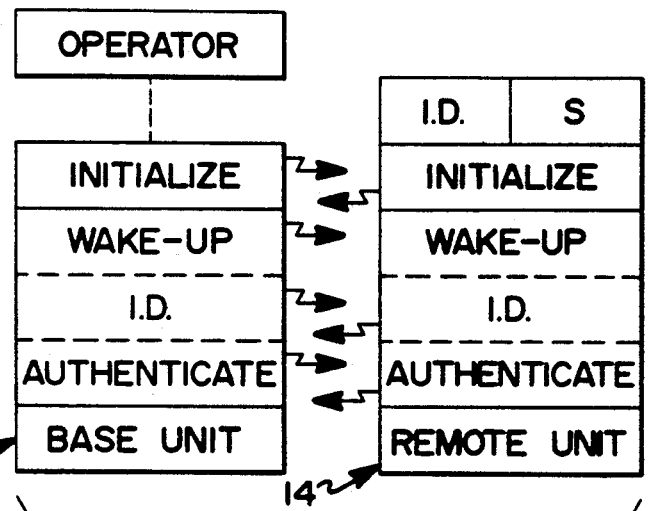
FIG. 2 is a diagram of base unit and remote unit modes for the system of FIG. 1.

The base unit 12 and the remote unit 14 operate in various modes as indicated in FIG. 2. The units must first be initialized to randomly select a common key and to register the remote ID with the base unit. This mode is authorized by operator input such as by entry of an access code on a keyboard in the vehicle. No other mode requires operator input. The initialization occurs only once to introduce a remote unit to a base unit, however, when a remote unit is used with more than one base unit or when a base unit is used with more than one remote unit, an initialization must take place for each pair of units.

After being initialized, the remote unit assumes a sleep state for low power consumption. When the remote unit enters the radio range of the base unit, a wake-up mode is entered wherein a signal from the base unit wakes up or alerts the remote unit to prepare its circuits for interrogation. This starts the ID mode. Then the base unit sends out ID signals corresponding to the various remote unit ID's stored during initialization. If an ID signal matches the ID of the particular remote unit in its range, the remote unit responds that a match has been made. The authentication mode is then entered to verify that the remote unit is indeed an authorized unit. During this mode an exchange of encrypted signals based on the previously established common key takes place.

After the wakeup, the general approach is for the base unit 12 to first identify which, if any, of several authorized remote units 14 is in its vicinity by a conventional polling scheme. The base unit then challenges the remote unit for information that only the legitimate remote unit can have. The challenge and correct response must be different each time to prevent accepting the playback of a previous correct response. The correct response must not be related to the challenge in a simple way. For a secure system it should not be possible to deduce the correct response with full knowledge of the system and all previous communications.

Cryptographic techniques provide a means to accomplish this. A cryptosystem performs a complicated transformation from input to output under the control of a variable called the key. Knowing the correct key it is possible to do the inverse transformation and recover the original input. For an ideal cryptosystem there should be no better way to determine the input from the output then trying all possible keys. By making this number large enough it becomes unfeasible to break the system even using a very high speed computer. An example of such a system is the data encryption standard (DES) approved by National Bureau of Standards and National Security Agency as suitable for computer data security, electronic funds transfer, etc. short of national security. DES uses a 56 bit key for about 72 quadrillion possibilities.

Conventional cryptosystems, such as DES, use the same key for both encryption and decryption. Each pair needing to communicate securely must have an individual key known to both but not anyone else. Security is a matter of keeping this private key secure. Public key cryptosystems use different keys for encryption and decryption where one cannot be easily derived from the other. The degree of difficulty can be made very high by making the keys sufficiently long.

The stated objectives can be met while staying within the constraints of low power consumption and quick response with a combination of a private key cryptosystem and either the RSA public key system disclosed in U.S Pat. No. 4,405,829 entitled "Cryptographic Communication System and Method" or the exponential key exchange previously mentioned and which is set forth in U.S. Pat. No. 4,200,770 entitled "Cryptographic Apparatus and Method". Exponential key exchange allows a remote unit and base unit to mutually agree upon a private key over an unsecured channel as follows. The remote unit and base unit each secretly select a number, F and B, respectively. They then compute $M^F.\text{mod}.N$ and $M^B.\text{mod}.N$, respectively, where N is a large prime number and both M and N are known to everyone. They exchange answers and then compute $P=(M^B.\text{mod}.N)^F.\text{mod}.N$ and $P=(M^F.\text{mod}.N)^B.\text{mod}.N$, respectively. They each arrive at the same value, $P=M^{F*B}.\text{mod}.N$, from a different combination of secret and public information. A eavesdropper cannot derive this value because of the difficulty of deriving F or B from $M^F.\text{mod}.N$ or $M^B.\text{mod}.N$ for large N. P is then shortened to the proper length and used as the private key for this particular remote unit and base unit pair.

To assure difficulty of deriving F or B, it is preferred that they have a length of several hundred bits, although a practical system may have only about 256 bits. While the base unit 12 may have a random number generator, this is not desirable for the remote unit 14. To provide such a large number F, having a random nature, a small random or pseudo-random seed number is provided by the base unit and passed to the remote unit. This seed is operated upon in conjunction with the secret key S to generate a number having 256 bits which is used as the exponent F.

To allow a single remote unit to operate with an unlimited number of base units (using an unlimited number of different P's) the remote unit does not store its copy of P. It lets the base unit do the storage. The remote unit first encrypts its copy of P using the built in secret key, S, to give $Q=S(P)$ then passes Q over the radio link to the base unit. The base unit stores Q along with its copy of P and the remote unit ID in its table of authorized users. This concludes the initialization or sign-up procedure.

Figure 3:
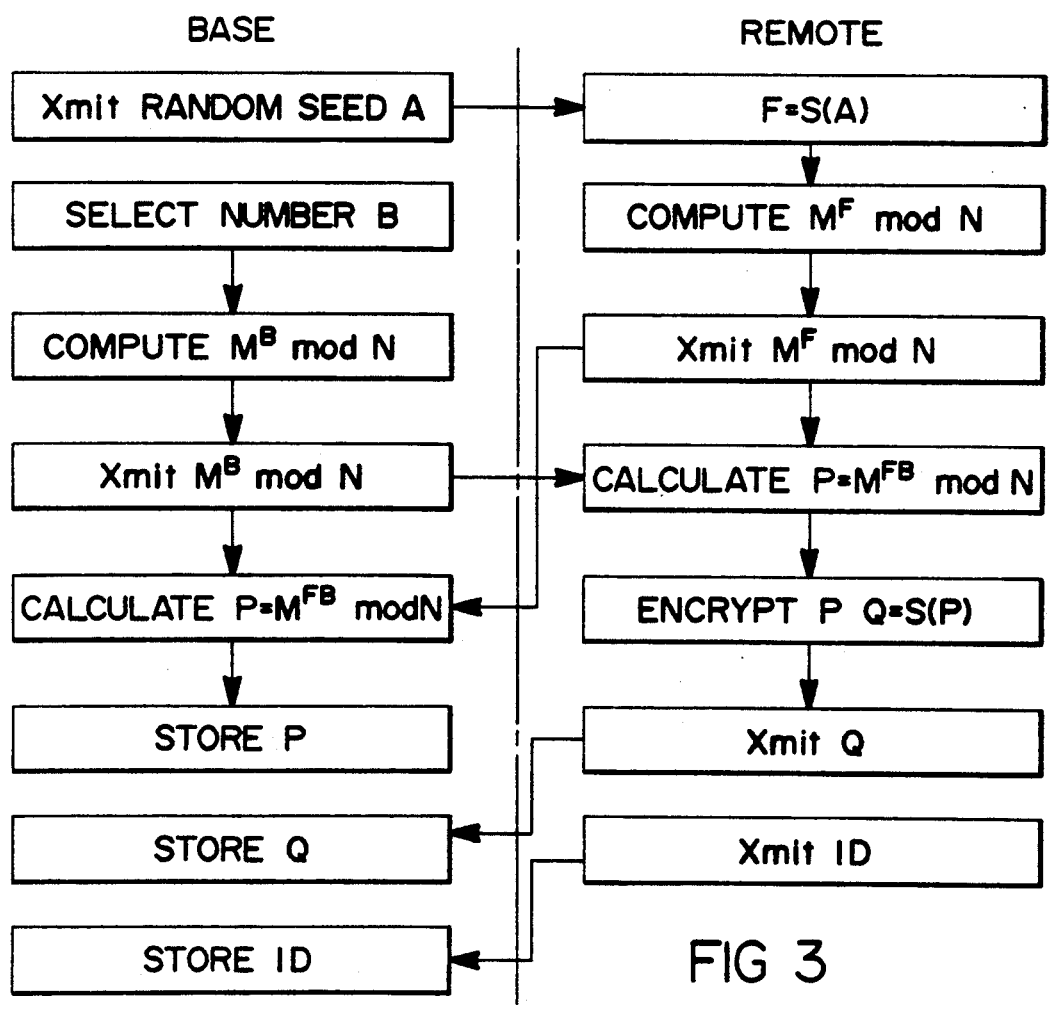
FIG. 3 is a diagram of initialization operations according to the invention.

The initialization is diagrammed in FIG. 3 which illustrates the operations in each of the base and remote units and the communications therebetween. First the base transmits the seed A to the remote unit which derives the exponent F from S and A while the base selects an exponent B. Then each unit calculates the particular remainder for its respective calculated exponential and transmits only the remainder to the other unit. Each unit calculates P by combining the local remainder and the received remainder. The base stores P while the remote unit encrypts P using secret key S and passes it to the base for storage. The ID is passed to the base for storage as well.

Other methods of selecting a common key may be used. The prime requisite is that the units agree on a randomly selected key in a secure manner. Public key cryptography may be used for this purpose. Public key cryptosystems use different keys for encryption and decryption where one cannot be easily derived from the other. The above mentioned RSA public key system is suitable. The public key system is used to communicate a common key for the base and remote units and the key is encrypted by the remote unit and stored in the base unit as described above.

After the remote unit is registered with the base unit as an authorized user, the remote unit can forget everything except the secret key, S, and its ID. When the base unit wishes to challenge the remote unit to prove its identity, it passes to the remote unit the encrypted private key, Q, and a random number, R. This pair of numbers comprises the challenge. The remote unit uses its secret key to decrypt Q to give P. It then uses P to encrypt R to give X=P(R) which it returns to the base unit. Meanwhile the base unit uses its copy of P to encrypt R to give X=P(R). The base unit compares the X's and if they match the remote unit is accepted as authentic.

Figure 4:
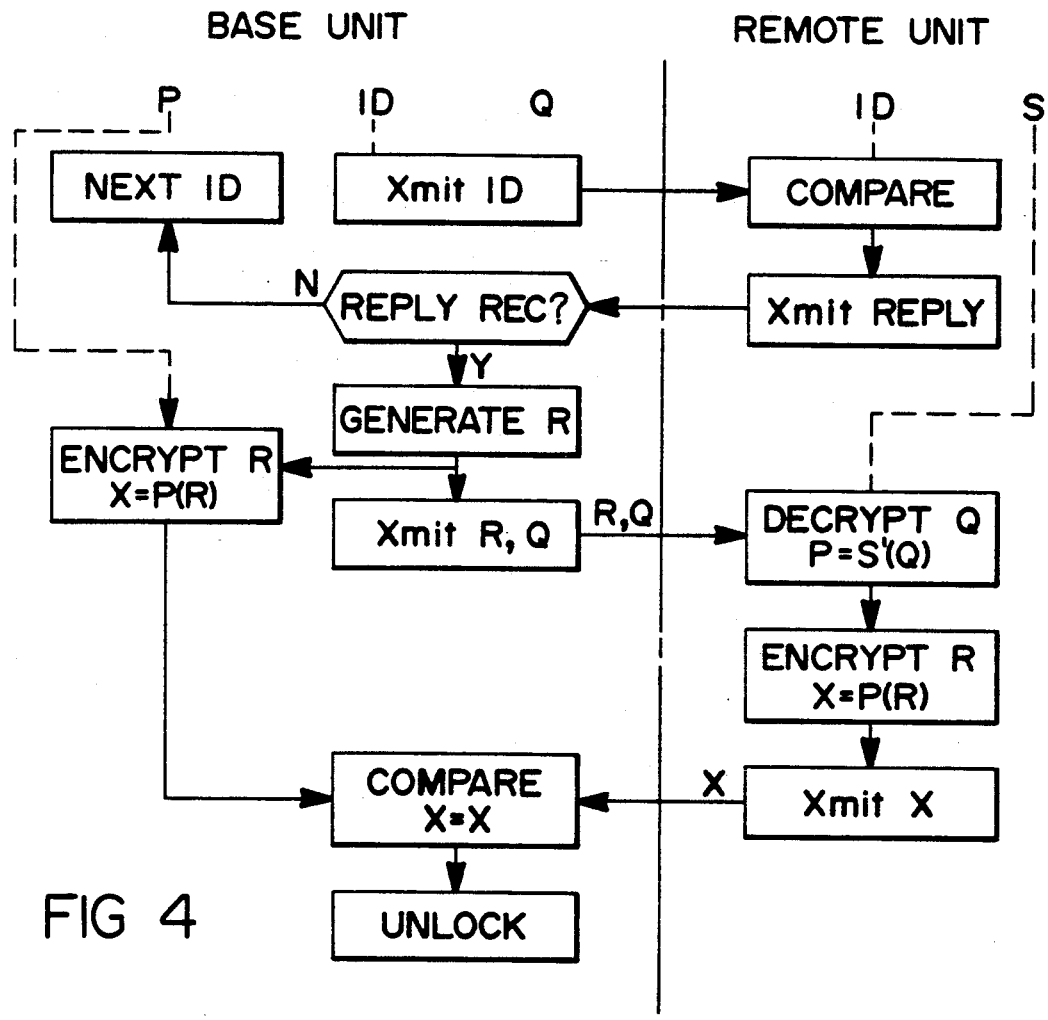
FIGS. 4 and 5 are diagrams of authentication operations according to the invention.

The authentication method (as well as the ID interrogation) is diagrammed in FIG. 4 which illustrates the operations in each of the base and remote units. The base unit has stored the key P, the ID and the encrypted key Q while the remote unit remembers the ID and S. The base unit transmits the ID, and the remote unit compares it with its ID, and if there is a match a reply is transmitted to the base. When no reply is received the next ID stored in the base is transmitted. When a reply is received, a random number R is generated and sent to the remote unit along with the Q which corresponds to the ID which was matched in the remote unit. The remote unit decrypts Q to get P and encrypts R to get X and passes it to the base. In the meantime the base also encrypts R to get X and compares the two X's.

Figure 5:
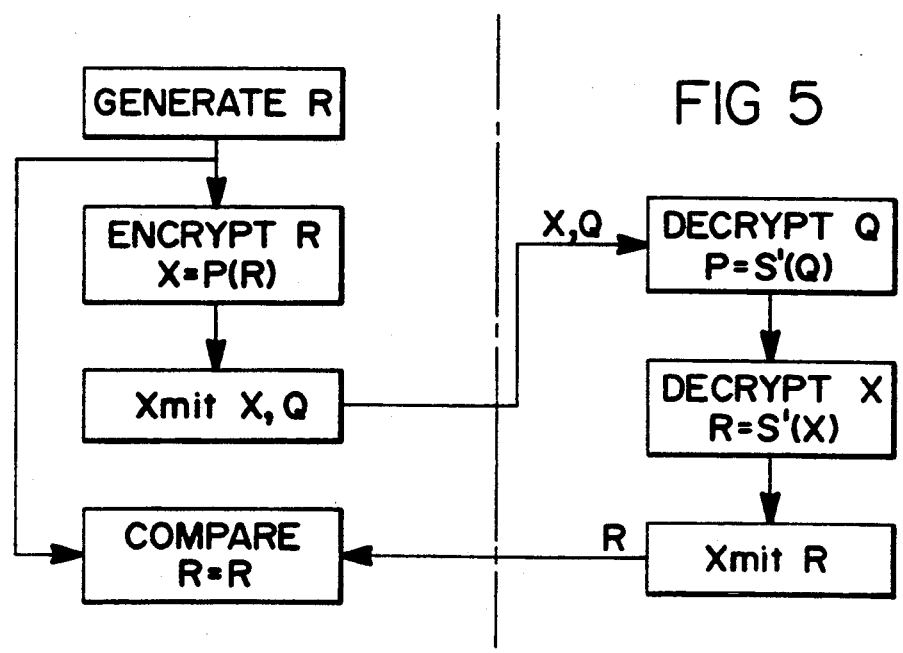

FIG. 5 shows a variant on the above described authentication operation. Here, R is encrypted to get X and the challenge comprises X and Q which are both decrypted in the remote unit to obtain R which is passed to the base unit and compared with the original R to determine whether there is a match.

To provide tolerance to faulty communications two different strategies are used. Some communications, such as the challenge and key exchange, must be perfect because the encryption process has the effect of randomizing the entire output if any input bit is changed. When communications are usually good but sometimes very bad and retransmission is possible, error detection can be more effective than error correction coding. A cyclic redundancy check with retransmission on request is preferred for critical messages.

For other communications close is good enough. The correct response to the challenge is already known to the base unit. The probability of a random response having 57 or more of the total of 64 bits correct is about 1 in 700 million. During polling the remote unit is looking for its specific ID. By selecting the ID's properly at the time of manufacture, all ID can be guaranteed to differ by some number of bits. For example 67 million 32 bit ID's can made to differ by at least four bits. The remote unit can answer to an ID that comes within 1 or 2 or even 3 bits of its own with very high confidence. This is a passive form of error correction. Similarly, the final comparison step of the authentication procedure does not have to require an exact match of all bits so long as there is a high probability that the remote unit determined the correct value in response to the challenge.

Both security and economic needs can be met by putting all the functions except the radio transceiver on a single IC. Secret information cannot be extracted from the IC without destroying it and then it is extremely difficult. The base unit performs many of the same functions as the remote unit. The IC can be designed to do either by providing a mode selection and host computer port. The base unit contains a host computer to interface to the vehicle and to maintain the authorization list. The host port can also facilitate production testing.

It is not necessary to include a random number generator in the IC. For the base unit a host computer can perform this function in software. The remote unit does not need its own random numbers. During sign-up the remote unit needs a seed number which is different each time. As described above, a different number is provided by the base unit and the remote unit makes it secret by encrypting it with the secret key S. The number is both unpredictable and secret without an explicit random number generator.

Only the correct remote unit, the one with which keys were initially exchanged, can provide the correct answer because only it has the correct S to transform Q to P. In effect, S is only used by the remote unit to communicate with itself at a later time. There is never any need or ability for S to be shared.

The embodiments of the invention in which an exclusive property or privilege is claimed are defined as follows:

1. In a secure remote access system having a base unit and a remote unit coupled by a communication link, the remote unit containing a private key known only to that particular remote unit, a method of authentication of the remote unit comprising the steps of:
   registering the remote unit with the base unit by establishing a randomly selected common key through communication between the base unit and the remote unit in a manner that maintains the privacy of the common key, and storing the common key and an encrypted form of the common key in the base unit;
   then authenticating the remote unit by encrypting a random number with the common key in the base unit, passing the encrypted common key and a challenge number from the base unit to the remote unit wherein the challenge number comprises one of the random number and the encrypted random number, decrypting the common key in the remote unit, operating on the challenge number with the common key in the remote unit and passing the result to the base unit, and comparing the results.

2. The invention as defined in claim 1 wherein the step of authenticating the remote unit comprises passing the encrypted common key and a random number from the base unit to the remote unit, decrypting the common key in the remote unit, encrypting the random number with the common key in the remote unit, and comparing the results.

3. The invention as defined in claim 1 wherein the challenge number is the encrypted random number, and the step of operating on the challenge number comprises decrypting the challenge number with the common key to reveal the random number, and passing the random number to the base unit for comparison with the original random number.

4. The invention as defined in claim 1 wherein the common key is established by exponential key exchange.

5. The invention as defined in claim 1 wherein the common key is established by a public key cryptographic method.

6. The invention as defined in claim 1 wherein a secret code is stored in the remote unit, and is used as a key for encrypting and decrypting the common key.

7. The invention as defined in claim 1 wherein a secret code is stored in the remote unit, and including the steps of passing a random seed to the remote unit and generating with the secret code and the seed a number used in establishing a common key.

8. In a secure remote access system having a base unit and a remote unit coupled by a communication link, a method of encrypted communication comprising the steps of:
secretly establishing a common key by communication between the base unit and the remote unit;
encrypting the common key in the remote unit by using a secret code in the remote unit;
passing the encrypted common key to the base unit for storage in the base unit;
then authenticating the remote unit by passing the encrypted common key and a random number from the base unit to the remote unit, decrypting the common key in the remote unit, encrypting the random number with the common key in both units, passing the result from the remote unit to the base unit, and comparing the results.

9. In a secure remote access system for an automotive vehicle having a base unit in the vehicle and a remote unit coupled to the base unit by a radio link subject to eavesdropping, the remote unit having a secret code, a method of authenticating the remote unit comprising the steps of:
initializing the system by providing the base unit and the remote unit with a common key, and encrypting the common key in the remote unit using the secret code for encryption and passing the encrypted common key via the radio link to the base unit for storage; and then
authenticating the remote unit when access is attempted by passing the encrypted common key and a random number to the remote unit, decrypting the common key in the remote unit, encrypting the random number with the common key in both units, and comparing the encrypted random numbers to determine authenticity.

10. The invention as defined in claim 9 wherein the encrypted random numbers each comprise a string of binary digits, and the step of comparing the encrypted random numbers includes passing an encrypted random number via the radio link to the base unit whereby the passed number is subject to transmission errors, and comparing the strings of binary digits for a near match, thus allowing for a small percent of transmission error.

11. The invention as defined in claim 9 wherein the step of providing the base unit and the remote unit with a common key comprises the steps of:
selecting a number in the base unit;
selecting a number which is a function of the secret code in the remote unit; and
establishing a common key by an exponential key exchange having secret exponents comprising the selected numbers in the respective units, whereby the common key is safe from detection.

12. The invention as defined in claim 11 wherein the step of selecting a number which is a function of the secret code comprises passing a seed from the base unit to the remote unit, and operating on the seed and the secret code to derive the selected number in the remote unit.

* * * * *